US012290905B2

(12) United States Patent
Wilday

(10) Patent No.: US 12,290,905 B2
(45) **Date of Patent: *May 6, 2025**

(54) MAGNETIC NIPPERS

(71) Applicant: LID RIG LTD., Littleton, CO (US)

(72) Inventor: Scott Wilday, Littleton, CO (US)

(73) Assignee: LID RIG LTD., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,351

(22) Filed: May 20, 2024

(65) Prior Publication Data

US 2024/0300072 A1 Sep. 12, 2024

Related U.S. Application Data

(63) Continuation of application No. 18/357,037, filed on Jul. 21, 2023, now Pat. No. 11,986,936, which is a continuation of application No. 17/030,768, filed on Sep. 24, 2020, now Pat. No. 11,745,314, which is a continuation-in-part of application No. 16/942,670, filed on Jul. 29, 2020, now abandoned.

(60) Provisional application No. 62/959,750, filed on Jan. 10, 2020, provisional application No. 62/883,256, filed on Aug. 6, 2019.

(51) Int. Cl.

*B25B 7/22* (2006.01)
*A45F 5/02* (2006.01)
*B26B 17/00* (2006.01)
*A45F 5/00* (2006.01)

(52) U.S. Cl.

CPC .................. *B25B 7/22* (2013.01); *A45F 5/02* (2013.01); *B26B 17/006* (2013.01); *A45F 5/1575* (2025.01)

(58) Field of Classification Search

CPC ........ A01K 97/00; A01K 91/18; B25B 27/00; B25B 7/22; Y10S 7/90; Y10S 7/901; A45F 5/02; A45F 2200/0575; B26B 17/006

USPC .......................................................... 224/183

See application file for complete search history.

(56) References Cited

U.S. PATENT DOCUMENTS

| | | | | |
|---|---|---|---|---|
| 11,745,314 B1 * | 9/2023 | Wilday | ..................... | A45F 5/02 224/183 |
| 11,986,936 B2 * | 5/2024 | Wilday | ..................... | A45F 5/02 |

* cited by examiner

*Primary Examiner* — Adam J Waggenspack
(74) *Attorney, Agent, or Firm* — Holland & Hart LLP

(57) ABSTRACT

A magnetic nipper is provided. The magnetic nipper has a pair of elongate arms with opposed first and second surfaces. The pair of elongate arms are hingedly connected to allow the pair of elongate arms to rotate about an axle. The first and second surf aces each contain at least one magnet have a polarity such that the magnets repel.

20 Claims, 6 Drawing Sheets

MAGNETIC NIPPERS

CROSS-REFERENCE TO RELATED PATENT APPLICATIONS

This application is a continuation application of U.S. patent application Ser. No. 18/357,037, entitled "MAGNETIC NIPPERS," filed on Jul. 21, 2023, which is a continuation of U.S. patent application Ser. No. 17/030,768, entitled "MAGNETIC NIPPERS," filed on Sep. 24, 2020, which is a continuation-in-part of U.S. patent application Ser. No. 16/942,670, entitled "MAGNETIC NIPPERS", filed on Jul. 29, 2020, which claims priority to and benefit from U.S. Patent Application No. 62/883,256, entitled "MAGNETIC NIPPERS," filed on Aug. 6, 2019, this application also claims priority to and benefit from U.S. Patent Application No. 62/959,750, entitled "MAGNETIC NIPPERS," filed Jan. 10, 2020, all of which are hereby incorporated by reference in their entirety for all purposes.

BACKGROUND

Nippers, sometimes known as end cutters or end cutting pliers, are used by fishermen to assist in preparing a hook and line for fishing. The conventional nipper typically comprises a pivotal jaw with a sharp blade on one side and handles or levers on the other side to transmit a pinching force to the sharp blade to facilitate the cutting or nipping of the line, hook, lure, or the like.

Conventionally, nippers are provided with removable blades that are sharp. The removable blade allows for each or both blades to be replaced. The blade needs to be replaced as the metal of the blade both dulls and corrodes over time due to use and exposure.

However, present nippers are small and difficult to keep track of while fishing. Additionally, the blade wear and corrosion can make the effectiveness of the nippers poor requiring more force and, sometimes, repetition.

Thus, against the above background, an improved nipper assembly would be desirous.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a metal nipper assembly is provided. The metal nipper assembly comprises a metal nipper and a base plate. The metal nipper is formed from a metal that is corrosion resistant, such as, for example, stainless steel. The metal nipper has a pair of opposed arms that are joined at a spring hinge. The handles terminate on a distal end with opposed blades or cutting edges. The opposed arms converge from the distal end to a proximal end and act as levers. Pinching the opposed arms compresses the spring hinge and provides a pinching or cutting force to a blade. At least one of the two handles has a surf ace that is either magnetic or contains magnets. The base plate is either magnetic or contains magnets that align with and releasably, magnetically couple the metal nipper to the base plate. Of course, other means for a releasable connection are possible including other magnet to magnet connections. The metal nipper is releasably coupled to the base plate such that the metal nipper can be removed from the base plate by hand for use and stored on the base plate when not in use.

In some aspects of the technology, the base plate contains a sharpening portion, such as, for example, a groove. The sharpening portion is shaped such that a hook, such as a fish hook, a knife blade, or a nipper blade (either individually or together) can be sharpened on the base plate.

In some embodiments, the base plate is formed of a metal that is shaped to fittingly engage an article of clothing, such as, for example, a hat rim, a shoulder strap, or the like. In certain embodiments, the base plate is formed into the article of clothing.

In some aspects of the technology, a metal nipper assembly is provided. The metal nipper is formed from a metal that is corrosion resistant, such as, for example, stainless steel. The metal nipper has a pair of opposed arms, which may be referred to as elongate members, that are joined at a hinge. The arms contain at least one magnetic, such that magnetics of a polarity are opposed on the inside surface of the arm. The magnetics provide a force tending to open the arms (e.g., the magnetics repel each other), or nippers. The hinge allows rotation of the arms about an axle of the hinge and provides a stop to prevent over rotation of the arms. The arms terminate on a distal end with opposed blades or cutting edges. The opposed arms converge from the distal end to a proximal end and act as levers. Pinching the opposed arms compresses provides a pinching or cutting force to a blade. When the pinching force is removed, the magnetics force the opposed arms to open.

These and other aspects of the present system and method will be apparent after consideration of the Detailed Description and Figures herein.

BRIEF DESCRIPTION OF DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a metal nipper assembly. However, the technology described herein may be used with applications other than those specifically described herein. For example, the technology of the present application may be applicable to forceps, line retractors, eye tools, knot tying tool, knife, box cutter, other blades, scissors, tippet holder, carabiner, leader straightener, fly patch holder, floatant holder, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
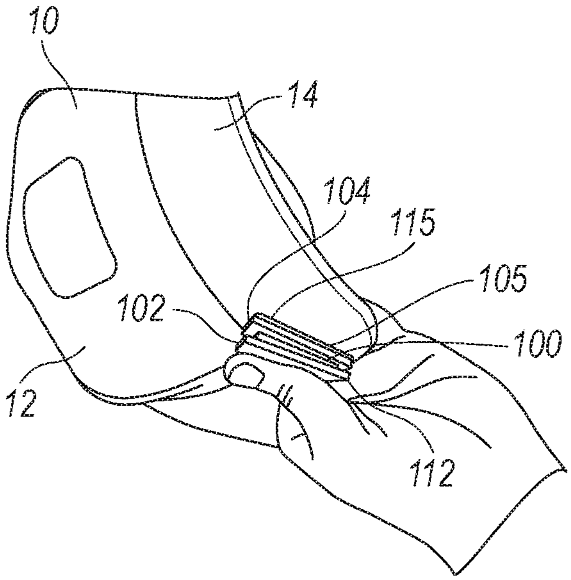
FIG. 1 is a view of a nipper assembly consistent with the technology of the present application.

With reference now to FIG. 1, a metal nipper assembly 100 is shown. The nipper assembly 100 is shown attached to an article 10, which in this exemplary embodiment the article 10 is an article of clothing and more particularly, the article of clothing is a hat 12 having a hat bill 14. The nipper assembly 100, however, may be attached to other articles 10 such as, for example, a shoulder strap, a belt, a belt buckle, a pocket, or the like. Also, while shown as attached to an article of clothing, the nipper assembly 100 may be clipped or snapped onto an article that is not clothing, such as a cooler strap or handle, a surface associated with a cooler, thermos, tackle box, or the like as well.

Figure 2:
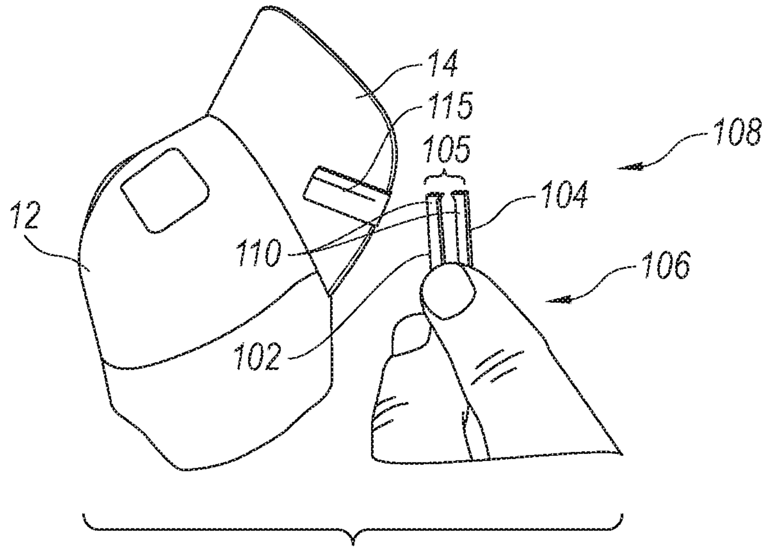
FIG. 2 is another view of the nipper assembly consistent with the technology of the present application.

The nipper assembly 100 includes a metal nipper 105 and a base plate 115, which are shown coupled together in FIG. 1 and separate in FIG. 2. As shown in FIG. 2, the metal nipper 105 includes a first elongate member 102 and a second elongate member 104 each having a proximal end 106 and a distal end 108. The distal end 108 of each of the first and second elongate members 102, 104 terminates in a cutting edge 110, which may be a blade or the like. The first and second elongate members 102, 104 are coupled closer to the proximal end 106 by a spring hinge 112, as seen in FIG. 1. The spring hinge 112 in a particular embodiment is explained further below.

During operation, the metal nipper 105 is removed from the base plate 115 as shown in FIG. 2. Pinching or squeezing the first and second elongate members 102 and 104 compresses the spring hinge 112 such that the cutting edges 110 move together to clip a fishing line, for example, or other object.

Figure 3:
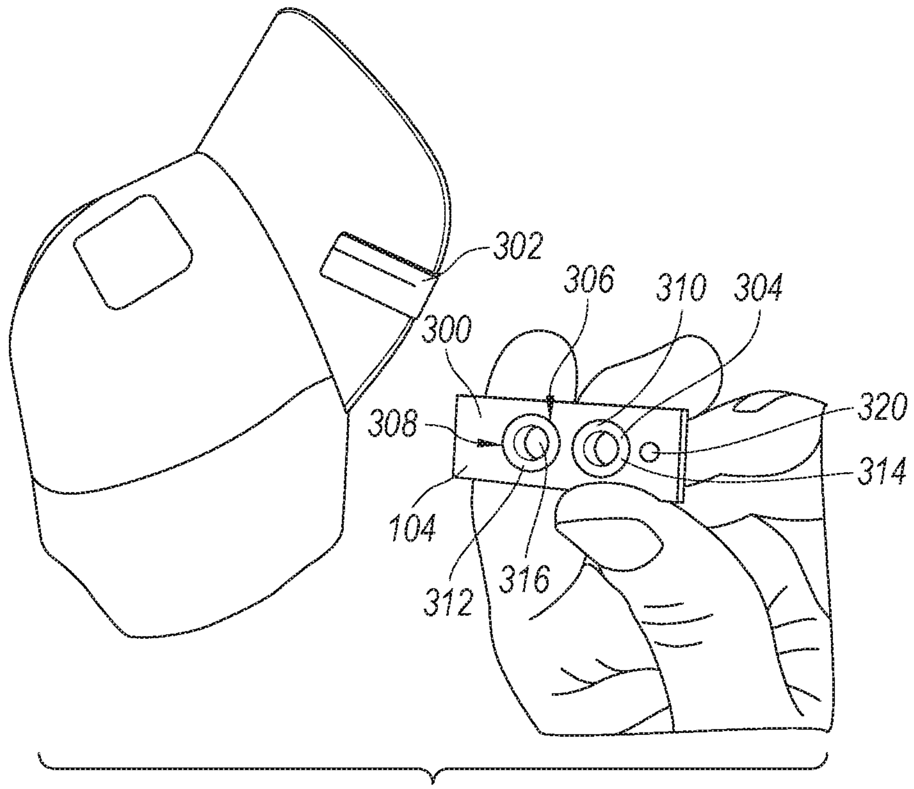
FIG. 3 is another view of the nipper assembly consistent with the technology of the present application.

Metal nipper 105 is generally made from a metal that is corrosion resistant to general oxidation. One particularly good metal for corrosion resistant is stainless steel. While certain stainless steels are magnetic, conventional stainless steel is not magnetic. With reference to FIG. 3, an outer surface 300 of the second elongate member 104 is shown. The outer surface 300 of the second elongate member 104 generally abuts a top surface 302 (sometimes referred to as the mounting surface) of the base plate 115. The second elongate member 104 has at least one cavity 304 in the outer surface 300, although the exemplary metal nipper 105 has two cavities 304. Each of the cavities 304 includes a bore 306 in a base 308 (neither specifically shown) of the at least one cavity 304. The bore 306 may be a threaded bore. A magnetic element 310 is disposed in the cavity 304. The magnetic element 310 has a through bore 312 and a counterbore 314 that forms a shoulder. A fastener 316, such as a set screw, couples the magnetic element 310 to the base first elongate member 104. In this particular embodiment, the fastener 316 is a set screw with a threaded shaft that threads into the bore 306 in the base. A head of the set screw abuts the shoulder formed by the counterbore 314. Thus, in this particular embodiment, threading the fastener 316 into the threaded bore 306 couples the magnetic element to the second elongate member 104.

Figure 4:
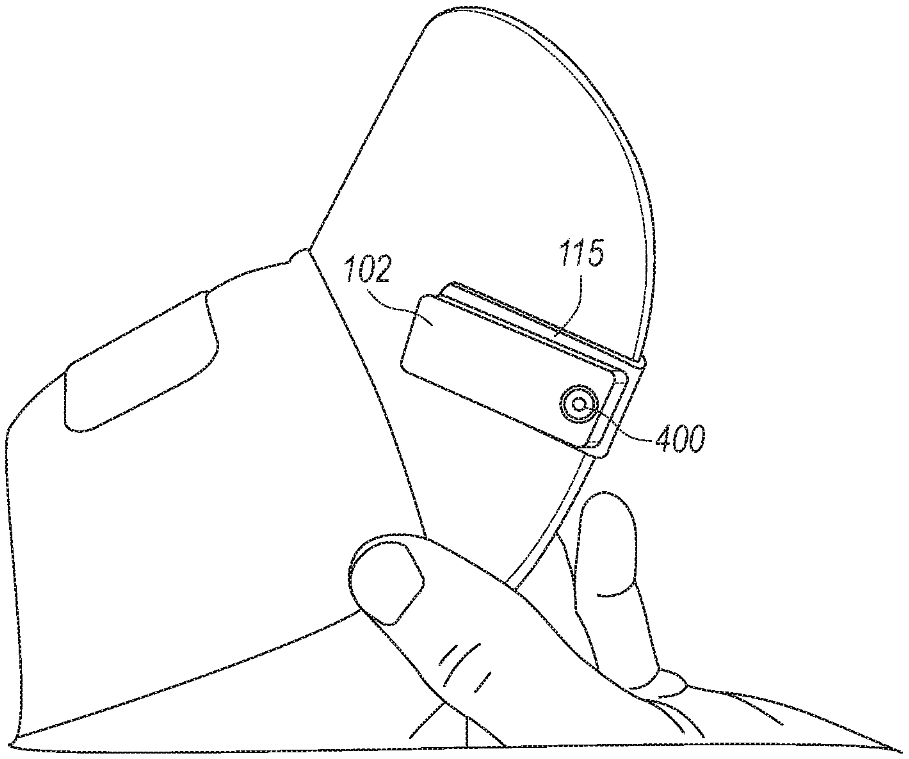
FIG. 4 is another view of the nipper assembly consistent with the technology of the present application.

The second elongate member 104 has a threaded bore 320 that aligns with a threaded bore 400 on the first elongate member 102, see FIG. 4. The threaded bores allow coupling the spring hinge 112 to the first and second elongate members 102, 104.

Figure 5:
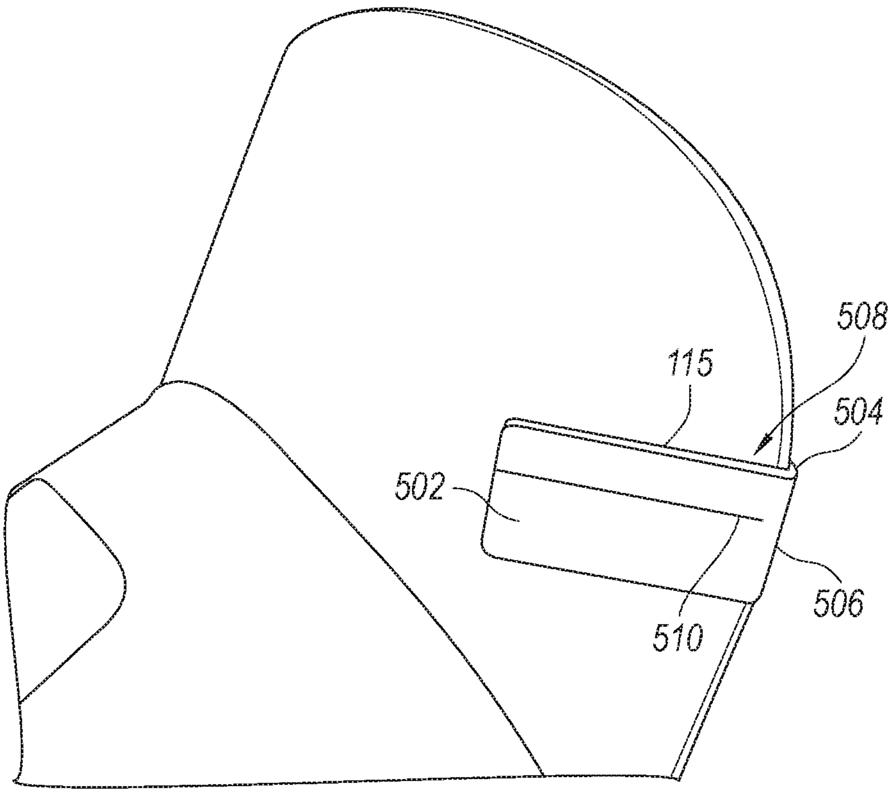
FIG. 5 is a view of a base plate of the nipper assembly consistent with the technology of the present application.

With reference to FIG. 5, the base plate 115 of the metal nipper assembly 100 is shown. The base plate 115, in this case, is a magnetic, metal material, such as steel, iron, or the like. The base plate 115 is formed from a sheet of the metal material. The base plate 115 has a first portion 502 coupled to a second portion 504, not specifically seen in FIG. 5, at a spring bend 506. The spring bend 506 is formed by rolling/folding the second portion 504 back over the first portion 502 to form a clamp space 508. The clamp space 508 separates the first portion 502 and the second portion 504 by a first thickness $T_1$. The first thickness $T_1$ is sized to be smaller than the article to which the base plate 115 is attached. In other words, the clamp space 508 is slightly smaller than a second thickness $T_2$, where the second thickness $T_2$ is the thickness of the article to which the base plate 115 will be attached.

When attaching the base plate 115 to the article 10, the clamp space 508 is expanded to fit onto the article 10, such as the hat bill 14 shown, to which the base plate 115 is attached. The expansion of the clamp space 508 plastically deforms the spring bend 506 that provides a compression force to clamp the article 10 between the first portion 502 and the second portion 504. To facilitate sliding the base plate 115 onto the article, the edges of the base plate 115 may be chamfered or beveled.

The base plate 115, alternatively, may be incorporated directly into the article 10. For example, the base plate 115 may be attached directly to a bill member and stitched in place by the fabric stitching. The base plate 115 may be covered by fabric, or other material, in certain embodiments. If the base plate 115 is covered by fabric, or other material, the covering should be such that it does not interfere with the magnets. The base plate 115, in certain embodiments, may be permanently affixed to the article 10, such as, for example, by being directly incorporated, glued, welded, or the like to the article.

The base plate 115 includes a groove 510. The groove 510 may be sized to receive a fish hook, a knife blade, the nipper cutting edge, or the like. The groove 510 is designed to allow for sharpening of the fish hook, knife blade, nipper cutting edge, or the like. To facilitate the durability and sharpening, the base plate 115 may be diamond coated.

Figure 6:
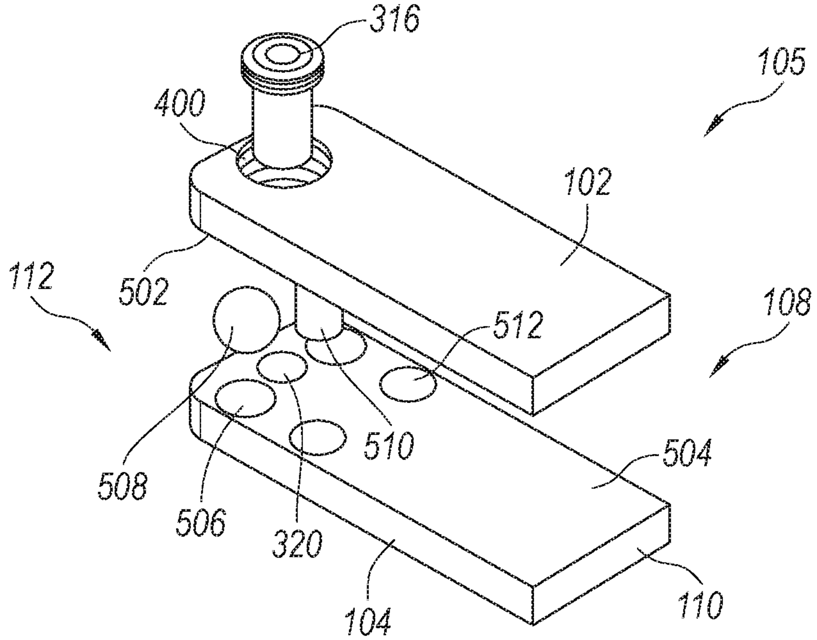
FIG. 6 is an exploded view showing a spring hinge of the nipper assembly consistent with the technology of the present application.

FIG. 6 shows an exploded view of the metal nipper 105 with the spring hinge 112 shown in more detail for this exemplary embodiment. The spring hinge 112 of this particular embodiment is shown and described here for completeness, but other means for hinging the first and second elongate members 102, 104 are possible. In this particular embodiment, the first and second elongate members have facing, opposed surfaces 502, 504. Each of the facing, opposed surfaces 502, 504 contains at least one socket 506 to receive a ball 508, such as a ball bearing. The present exemplary embodiment contains two sockets 506 in each of the facing opposed surfaces 502, 504 and a pair of balls 508.

The threaded bores 320 and 400 are aligned to receive the fastener 316, such is a screw 316 in this embodiment. A coil spring 510 is contained between the first and second elongate members and generally under compression, which tends to cause the coil spring 510 to provide an expansion force moving the first and second elongate members 102, 104 aware from each other. The fastener 316 holds the first and second elongate members 102, 104 together on the balls 508 with the coil spring 510 in compression. Pinching the first and second elongate member 102, 104 causes the distal end 108 (and cutting edges 110) to move towards each other and cut. This action puts the coil spring 510 under compression such that when the pinch force is removed, the distal end 108 opens. The facing, opposed surfaces 502, 504 may have divots 512 to contain the coil spring 510. As can be appreciated from FIG. 6, each facing, opposed surface 502, 504 has a pair of divots 512 and two coil springs 510.

Figure 7:
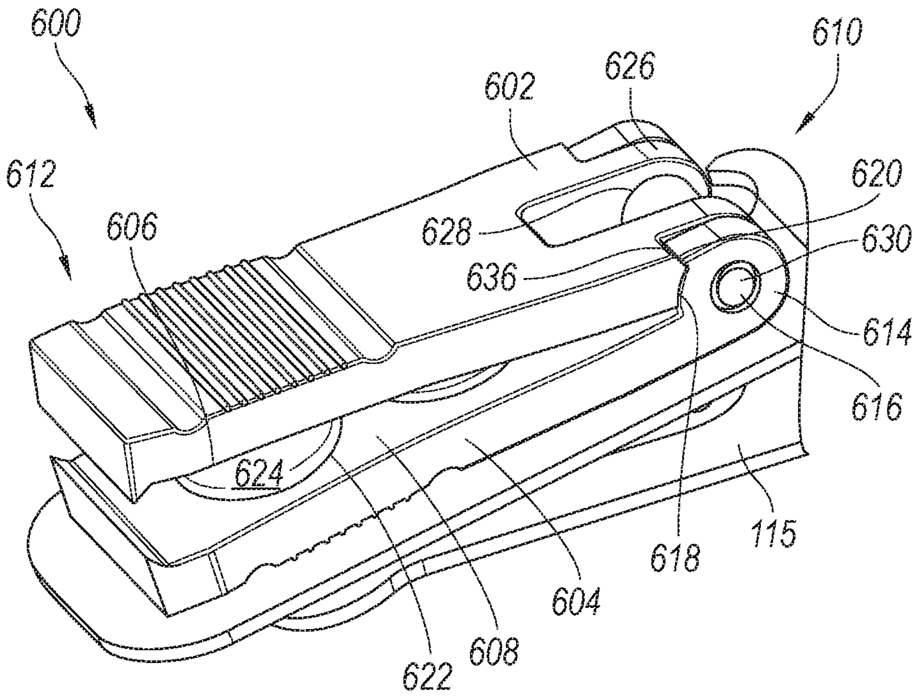
FIG. 7 is a view of a nipper assembly consistent with the technology of the present application.
Figure 8:
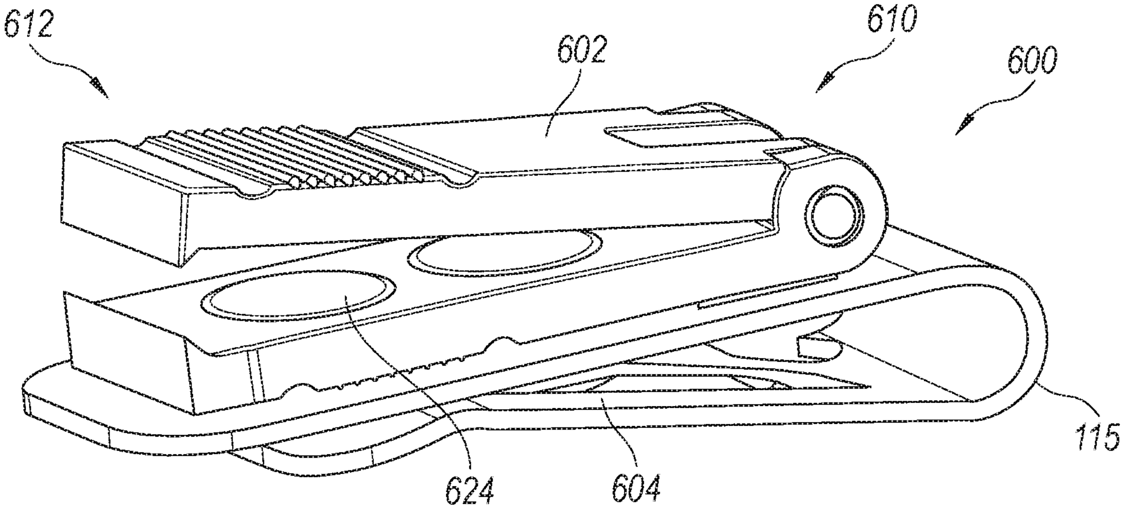
FIG. 8 is another view of the nipper assembly of FIG. 7.

FIGS. 7 and 8 show another embodiment of a nipper assembly 600. The nipper assembly 600 is similar to the nipper assembly 100, which similarities will not be re-explained herein. The nipper assembly 600, however, has a different hinge construction than the nipper assembly 100 described in FIG. 6 above. The nipper assembly 600 comprises a first elongate member 602 (or first arm 602) and a second elongate member 604 (or second arm 604). The first elongate member 602 has a first surface 606. The second elongate member 604 has a second surface 608 opposed to the first surface 606. Both the first and second elongate member 602, 604 have proximal ends 610 and distal ends 612.

The second elongate member 604 has a pair of first tangs 614 at the proximal end 610, which is opposite the cutting edges not specifically labeled or described here. The first tangs 614 have aligned bores 616, which could be through bores as shown or blind bores. The first tangs have a sliding surf ace 618 shaped to engage a corresponding movement surf ace on the first elongate member 602, explained further below. The sliding surface 618 ends in a stop 620. The second surface 608 has at least one (1) cavity 622 that receives a magnet 624 (which could be the same magnet as described above that is used to couple the nipper assembly 600 to a base plate 115 or different magnets).

The first elongate member 602 has a pair of engagement lobes 626 at the proximal end 610. The engagement lobes are sized and shaped to rotate with respect to the first tangs 614. The engagement lobes 626 have aligned bores 628 that further align with the bores 616 of the first elongate member 602. A pin 630 extends through the aligned bores 616 and 626 such that the first elongate member 602 and the second elongate member 604 are hingedly coupled by the pair of first tangs and the pair of engagement lobes. In other words, the tangs 614, lobes 626, and pin 630 together form a hinge with an axle to allow rotation of the first elongate member 602 and the second elongate member 604. Although not shown, the second elongate member 604 has at least one cavity (1) 632, aligned with the at least one cavity 622, that has a magnet 634 (also not shown) having the same polarity as the magnet 624 such that the magnets 624 and 634 tend to repel. The first elongate member 602 has a movement surface 636 that is shaped to cooperatively engage the sliding surface 618. The movement surface 636 slides (relatively) over the sliding surface 618 until the second elongate member engages the stop 620. Thus, the magnets 624 and 634 provide a force tending to move the first elongate member 602 and the second elongate member 604 apart until the second elongate member engages the stop 620, e.g., the first elongate member 602 pivots about the pin 630 relatively to the second elongate member 604. During use, a user would pinch the first and second elongate members 602, 604 to overcome the magnet force to cause the cutting edge to engage.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A nipper assembly for cutting fishing line, the nipper assembly comprising:

a nipper including:

a first elongate member having a first cutting edge located at a terminus of a distal end of the first elongate member, at least one engagement lobe having a bore, the at least one engagement lobe located at a proximal end of the first elongate member, the first elongate member comprising a first surface having at least one cavity containing a first magnet;

a second elongate member having a second cutting edge located at a terminus of a distal end of the second elongate member and being pivotally connected to the first elongate member, at least one tang having a bore where the bore of the at least one engagement lobe aligns with the bore of the at least one tang, the at least one tang located at a proximal end of the second elongate member, the second elongate member comprising a second surface having at least one cavity aligned with the at least one cavity of the first surface and containing a second magnet, the second magnet providing a magnetically couplable surface and having the same polarity of the first magnet such that the first elongate member and the second elongate member separate with a magnetic force; and a pin extending through the aligned bores such that the first elongate member and the second elongate member pivot about the pin.

2. The nipper assembly of claim 1, further comprising:

a base plate releasably and magnetically coupled with the nipper.

3. The nipper assembly of claim 2, wherein the base plate comprises a clamp for clamping.

4. The nipper assembly of claim 2, wherein the base plate comprises a groove for sharpening a sharp edge.

5. The nipper assembly of claim 1, wherein the first cutting edge and the second cutting edge are blades.

6. The nipper assembly of claim 5, wherein the blades are replaceable.

7. The nipper assembly of claim 1, wherein the first surface comprises a plurality of cavities and each of the plurality of cavities contains a first magnet and the second surface comprises a corresponding plurality of cavities and each of the corresponding plurality of cavities contains a second magnet.

8. The nipper assembly of claim 1, further comprising a stop arranged on one of the first and second elongate members to control a maximum angle of relative rotation between the first and second elongate members.

9. A nipper assembly for cutting fishing line, the nipper assembly comprising:

a nipper including:

a first elongate member comprising:

a proximal end;

a distal end;

a first cutting edge located at a terminus of the distal end;

at least one engagement lobe at the proximal end having a bore and a movement surface;

a first surface having a first cavity; and a first magnet positioned in the first cavity; and a second elongate member comprising:

a proximal end;

a distal end;

a second cutting edge located at a terminus of the distal end;

at least one tang at the proximal end having a bore and a sliding surface, the bore of the at least one tang being aligned with the bore of the at least one engagement lobe, the sliding surface operatively shaped such that the movement surface slides along the sliding surface, wherein the at least one tang is aligned with the at least one engagement lobe;

a second surface having at least one cavity aligned with the at least one cavity of the first surface and containing a second magnet, the second magnet providing a magnetically couplable surface and having the same polarity of the first magnet such that the first elongate member and the second elongate member separate with a magnetic force; and a pin extending through the bore of the at least one engagement lobe and the bore of the at least one tang such that the first elongate member and the second elongate member pivot about the pin.

10. The nipper assembly of claim 9, further comprising:

a base plate, where the nipper and the base plate are releasably, magnetically, coupled, wherein the base plate comprises a clamp.

11. The nipper assembly of claim 9, further comprising a stop arranged on one of the first and second elongate members to control a maximum angle of relative rotation between the first and second elongate members.

12. The nipper assembly of claim 9, wherein the first elongate member includes a plurality of magnets and the second elongate member includes a plurality of magnets.

13. The nipper assembly of claim 9, wherein the first cutting edge and the second cutting edge are blades.

14. The nipper assembly of claim 13, wherein the blades are replaceable.

15. A nipper assembly for cutting fishing line, the nipper assembly comprising:

a nipper including:

a first elongate member having a first cutting edge located at a terminus of a distal end of the first elongate member, at least one engagement lobe having a bore located at a proximal end of the first elongate member, the first elongate member comprising a first surface having at least one cavity containing a first magnet;

a second elongate member having a second cutting edge located at a terminus of a distal end of the second elongate member and being pivotally connected to the first elongate member, at least one tang having a bore where the bore of the at least one engagement lobe aligns with the bore of the at least one first tang, the at least one tang located at a proximal end of the second elongate member, the second elongate member comprising a second surface having at least one cavity aligned with the at least one cavity in the first surface containing a second magnet, the second magnet having a polarity the same as the first magnet such that the first elongate member and the second elongate member repel with a magnetic force and the second magnet is used to couple the second elongate member to one or more different magnets on an outer surface of the second elongate member; and a pin extending through the aligned bore such that the first elongate member and the second elongate member pivot about the pin.

16. The nipper assembly of claim 15, further comprising:

wherein the one or more different magnets include a base plate, where the nipper and the base plate are releasably, magnetically, coupled.

17. The nipper assembly of claim 16, wherein the base plate comprises a clamp for clamping.

18. The nipper assembly of claim 15, further comprising a stop arranged on one of the first and second elongate members to control a maximum angle of relative rotation between the first and second elongate members.

19. The nipper assembly of claim 15, wherein the first cutting edge and the second cutting edge are blades.

20. The nipper assembly of claim 19, wherein the blades are replaceable.

* * * * *